(12) United States Patent
Hasegawa

(10) Patent No.: US 6,307,485 B1
(45) Date of Patent: Oct. 23, 2001

(54) MAP DISPLAY UNIT

(75) Inventor: Shinichi Hasegawa, Shizuoka-ken (JP)

(73) Assignee: Jatco Corporation, Fuji (JP)

( * ) Notice: Subject to any disclaimer, the term of this patent is extended or adjusted under 35 U.S.C. 154(b) by 0 days.

(21) Appl. No.: 09/404,761

(22) Filed: Sep. 24, 1999

(30) Foreign Application Priority Data

Sep. 25, 1998 (JP) ................................. 10-270713

(51) Int. Cl.$^7$ ................................. G08B 1/123
(52) U.S. Cl. ................... 340/995; 340/990; 701/212
(58) Field of Search ................... 340/995, 988, 340/997; 701/212, 211, 208, 213

(56) References Cited

U.S. PATENT DOCUMENTS

| | | | | |
|---|---|---|---|---|
| 4,402,050 | * | 8/1983 | Tagami et al. | 701/300 |
| 4,531,123 | * | 7/1985 | Tagami et al. | 340/995 |
| 4,535,335 | * | 8/1985 | Tagami et al. | 340/995 |
| 4,608,656 | * | 8/1986 | Tanaka et al. | 701/212 |
| 4,675,676 | * | 6/1987 | Takanabe et al. | 340/995 |
| 5,289,167 | * | 2/1994 | Kurosawa et al. | 340/461 |
| 5,450,343 | * | 9/1995 | Yurimoto et al. | 701/208 |
| 5,475,387 | * | 12/1995 | Matsumoto | 340/990 |
| 5,521,826 | * | 5/1996 | Matsumoto | 701/208 |
| 5,696,684 | * | 12/1997 | Ueberschaer | 701/200 |
| 5,978,715 | * | 11/1999 | Briffe et al. | 701/11 |
| 6,128,573 | * | 10/2000 | Nomura | 701/208 |
| 6,151,552 | * | 11/2000 | Koizumi et al. | 701/211 |

\* cited by examiner

Primary Examiner—Benjamin C. Lee
(74) Attorney, Agent, or Firm—Blank Rome Comisky & McCauley, LLP

(57) ABSTRACT

A map display unit is provided with a set uni that sets a rule for extracting map information from a storage device. The set unit sets a first rule for most preferentially extracting map information on the largest scale and a second rule for most preferentially extracting map information on a specified scale. For this reason, if the first rule is set, a map on the largest scale having detailed information can be displayed, even if a map were switched. Therefore, the accuracy of route guidance can be enhanced by displaying a map suitable when passing through complicated geographical features or city. On the other hand, if the second rule is set, an arbitrary scale can be specified. For example, if a map on the smallest scale is specified, it can overlook a wide range of area and therefore the entire planed route can easily be grasped.

11 Claims, 9 Drawing Sheets

Specify a selection mode for a map

22 —

Largest-enlargement map mode

Same-scale map mode

Manual selection mode

FIG. 4

22 — Specify a selection
mode for a map

**Largest-enlargement
map mode**

Same-scale map mode

Manual selection mode

F I G. 7
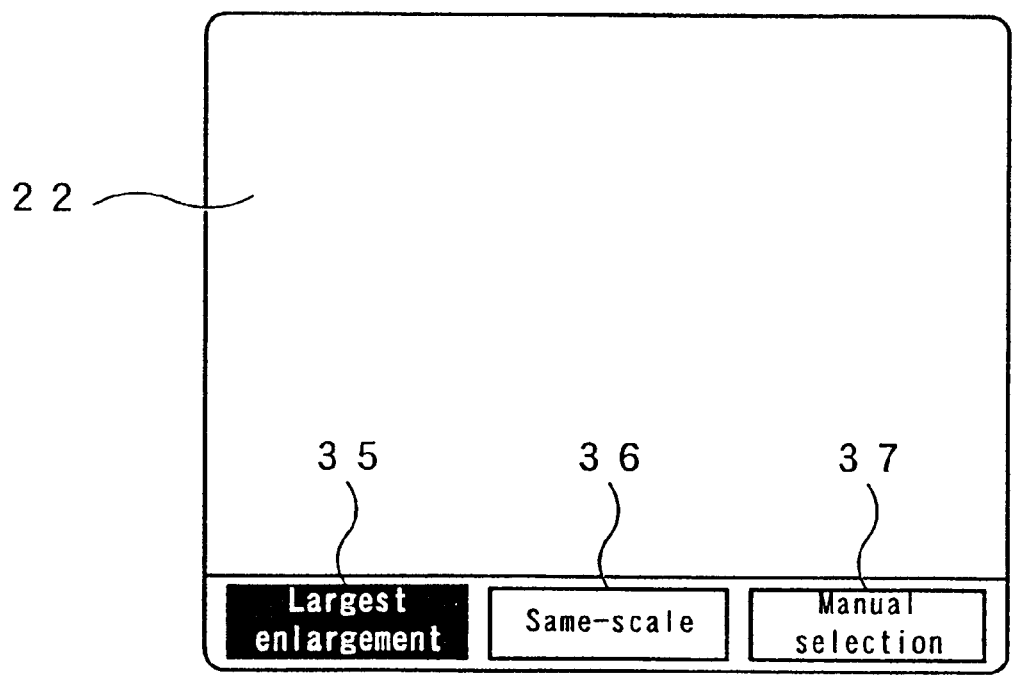

MAP DISPLAY UNIT

FIELD OF THE INVENTION

The present invention relates to a map display unit that utilizes, for example, global positioning system (GPS) satellites to measure its present position and displays a mark representing the present position along with map information, and more particularly to a map display unit suitable for carrying.

DESCRIPTION OF THE RELATED ART

As shown in FIG. 8, a navigation system mounted in a vehicle is constructed of a GPS antenna 1, a GPS receiver 2, a navigation control section 3, a CD-ROM drive unit 4, and a display unit 5. Radio wave 7 from each of a plurality of GPS satellites 6 is received with the GPS antenna 1. The received signal is modulated with the GPS receiver 2 in order to measure the present position of the system. Also, the navigation control section 3 synthesizes a mark representing the present position and the map information read out from the CD-ROM drive unit 4. The synthesized information is sent to the display unit 5 to give the driver or the passenger visual route guidance. The vehicle navigational system, however, is bulky and unsuitable for carrying.

Hence, there is a portable GPS receiver can be carried. In a GPS receiver without a CD-ROM drive unit so an example, as illustrated in FIG. 9, only necessary map information is downloaded from the map server 8 to a GPS receiver 9. The map server 8 employs, for example, a personal computer. A map disk 11 is shoved into the CD-ROM drive unit 10 of the map server 8. Then, the map server 8 executes a predetermined application program to transmit the map information included in the selected range to the GPS receiver 9. The transmitted map information is stored in the semiconductor storage memory of the GPS receiver 9. Thereafter, the stored map information is carried by the GPS receiver 9 and used for displaying a map.

Incidentally, the map disk 11 stores map information on various reduced scales from one which can overlook the entire territory to one which can overlook a partial region so that the shape of a building, etc. can be pinpointed, even when limited to Japanese territory, for example. For this reason, the map information transmitted to the GPS receiver 9 includes the map information on various reduced scales in the selected range. For instance, when the "Hokkaido" district is selected, the map information includes a wide-area map (small scale-far-off view) of the entire district, a sectional map(medium scale) of each section, and a detailed map(large-scale-close-up view) of each city, etc.

Carrying information about maps different in educed scale is easy to use. The reason is that a small-scale map of a large area is easy to view in planning a route, while a large-scale map of a small area is easy to view at a place near an intermediate point or a destination.

However, since it takes time and labor to change a reduced scale frequently and operability is poor, there is room for improvement in easiness of use.

SUMMARY OF THE INVENTION

It is an object of the present invention to provide a map display unit that is capable of reducing the number of map selection operations on different scales in order to improve its operability.

To achieve the foregoing objects and in accordance with one important aspect of the present invention, there is provided a map display unit that comprises (1) position detection means for detecting its present position, (2) storage means for storing map information on various scales, (3) extraction means for extracting map information including the present position detected by the position detection means from the storage means in accordance with a predetermined extracting rule, (4) display control means for synthesizing a mark representing the present position and the extracted map information and then displaying them on display means, and (5) set means for setting the extracting rule. The set means sets a first rule for most preferentially extracting map information on the largest scale and a second rule for most preferentially extracting map information on a specified scale.

The present invention is provided with the set means that sets a rule for extracting map information from the storage means. The set means sets a first rule for most preferentially extracting map information on the largest scale and a second rule for most preferentially extracting map information on a specified scale. For this reason, if the first rule is set, a map on the largest scale having detailed information can be displayed, even if a map were switched. Therefore, the accuracy of route guidance can be enhanced by displaying a map suitable when passing through complicated geographical features or city. On the other hand, if the second rule is set, an arbitrary scale can be specified. For example, if a map on the smallest scale is specified, it can overlook a wide range of area and therefore the entire planed route can easily be grasped.

In another important aspect of the present invention, there is provided a map display unit that comprises (1) position detection means for detecting its present position, (2) storage means for storing map information on various scales including a predetermined map on a predetermined scale which must overcome a barrier in order to move out of the predetermined map, (3) extraction means for extracting map information including the present position detected by the position detection means from the storage means in accordance with a predetermined extracting rule, (4) display control means for synthesizing a mark representing the present position and the extracted map information and then displaying them on display means, and (5) set means for setting the extracting rule. The set means sets a first rule for most preferentially extracting map information on the largest scale and a second rule for most preferentially extracting map information on a specified scale.

According to the present invention, the storage means stores map information on various scales including a predetermined map on a predetermined scale which must overcome a barrier in order to move out of the predetermined map. When a corresponding map is not present, the predetermined map can be displayed instead. As a result, a blank map display can be eliminated.

In a preferred form of the present invention, the set means further sets a third rule for having a user select displayed scales of corresponding maps and also extracting map information on the selected scale.

According to the preferred form of the present invention, a map on a desired scale can be selected and displayed, each time a map is switched. Although time is taken, a map on an optimal scale can always be displayed.

In another preferred form of the present invention, the map display unit as set forth in claim 1, wherein the set means sets a fourth rule for extracting a map on the second-largest scale in corresponding maps when a map on the largest scale is not present in the corresponding maps in setting the first rule, and also displays a message indicating that the scale of the map has been changed.

According to the preferred form of the present invention, in the case where a map on the largest scale is not present in corresponding maps, a map on the second largest scale in the corresponding maps is displayed and a message indicating the change of the reduced scale is displayed. Therefore, a blank map display can be avoided and the change of the reduced scale can be grasped.

In still another preferred form of the present invention, the map display unit as set forth in claim 1, wherein the set means sets a fifth rule for having a user select one of displayed scales of corresponding maps when a map on a specified scale is not present in the corresponding maps in setting the second or third rule and also for extracting a map on the selected scale. The set means also sets a sixth rule for displaying only the present-position mark without extracting the corresponding maps when the scales of the corresponding maps are not selected.

According to the preferred form of the present invention, when a map on a specified scale is not present in corresponding maps, the user selects one of displayed scales of the corresponding maps and also when a map on the selected scale is displayed. Therefore, a blank map display can be avoided. On the other hand, when the scales of the corresponding maps are not selected, only the present-position mark is displayed without extracting the corresponding maps. Therefore, the moving direction and the roughly moved distance can be grasped.

In a further preferred form of the present invention, the map display unit as set forth in claim 7, wherein the set means displays information indicating a relative relation between a mark position on a map being displayed just before and the newest mark position in setting the sixth rule.

According to the preferred form of the present invention, the information, indicating a relative relation between a mark position on a map being displayed just before and the newest mark position, is displayed.

Therefore, the moving direction and the moved distance can be grasped quantitatively.

BRIEF DESCRIPTION OF THE DRAWINGS

The above and other objects and advantages will become apparent from the following detailed description when read in conjunction with the accompanying drawings wherein:

FIG. 4 is a diagram showing the mode specifying menu screen displayed on the liquid crystal display of FIG. 1;

FIG. 7 is a diagram showing the screen of the liquid crystal display including icons for selecting modes;

DETAILED DESCRIPTION OF THE PREFERRED EMBODIMENTS

An embodiment of the present invention, applied to a portable map display unit of a GPS-antenna integrated type, will hereinafter be described in reference to the drawings.

Figure 1:
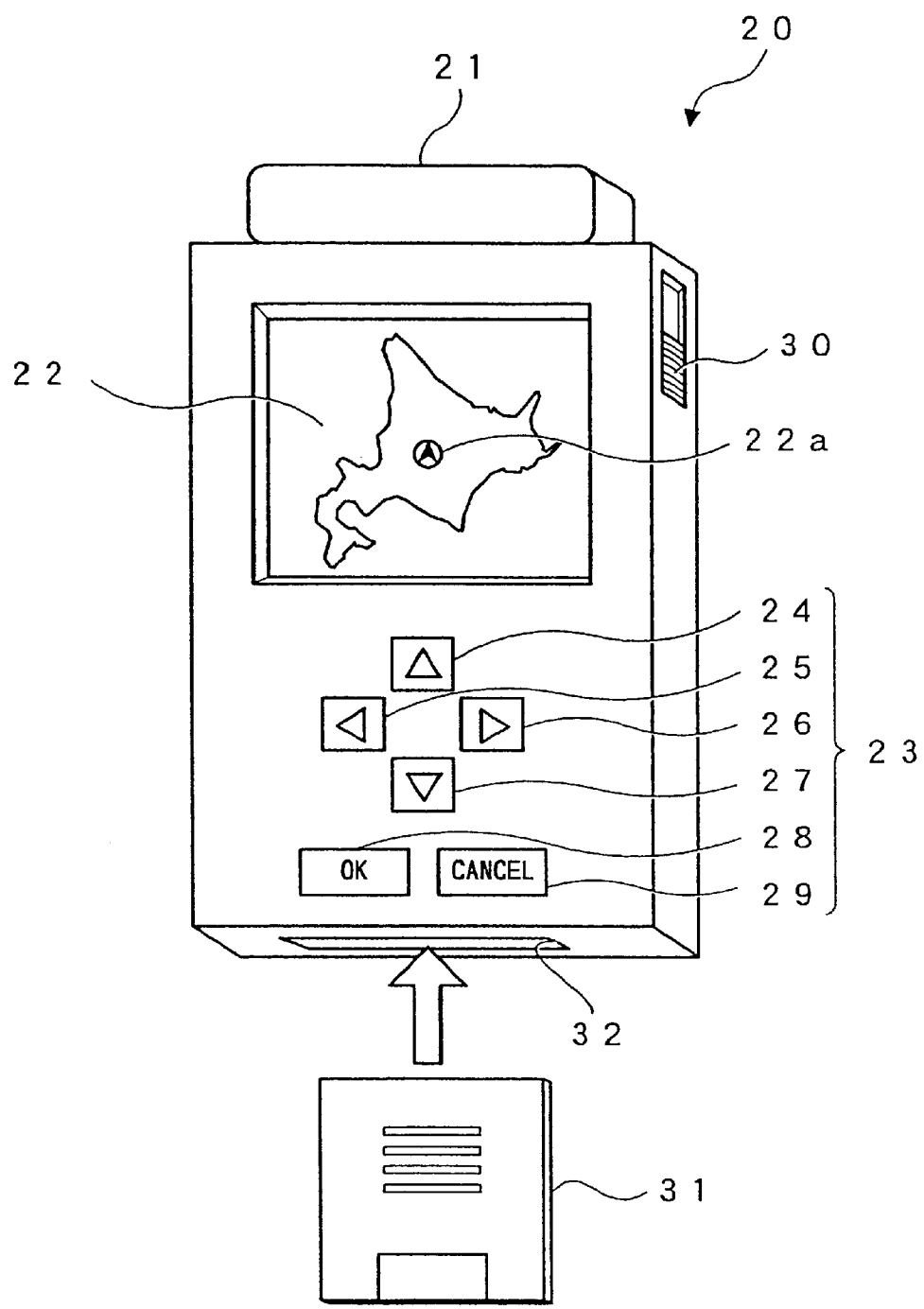
FIG. 1 is a perspective view showing a map display unit.

In FIG. 1, reference numeral 20 denotes a portable map display unit. This portable map display unit 20 has a GPS antenna 21 attached to the top surface thereof. The map display unit 20 is provided at the front surface thereof with a liquid crystal display 22 and a key switch group 23 (e.g., up, down, right, and left direction keys 24–27, OK key 28, cancel key 29, etc.). Reference numeral 22a denotes a present-position mark. Also, the map display unit 20 is provided at the right surface thereof with a slide-type power switch 30 and at the bottom surface thereof with an inserting hole 32 for a small memory card (storage means) 31. The memory card 31 is referred to as a smart medium for convenience. Note that, instead of the memory card 31, flash memory, a CD-ROM drive, or a DVD-ROM drive may be employed.

Figure 2:
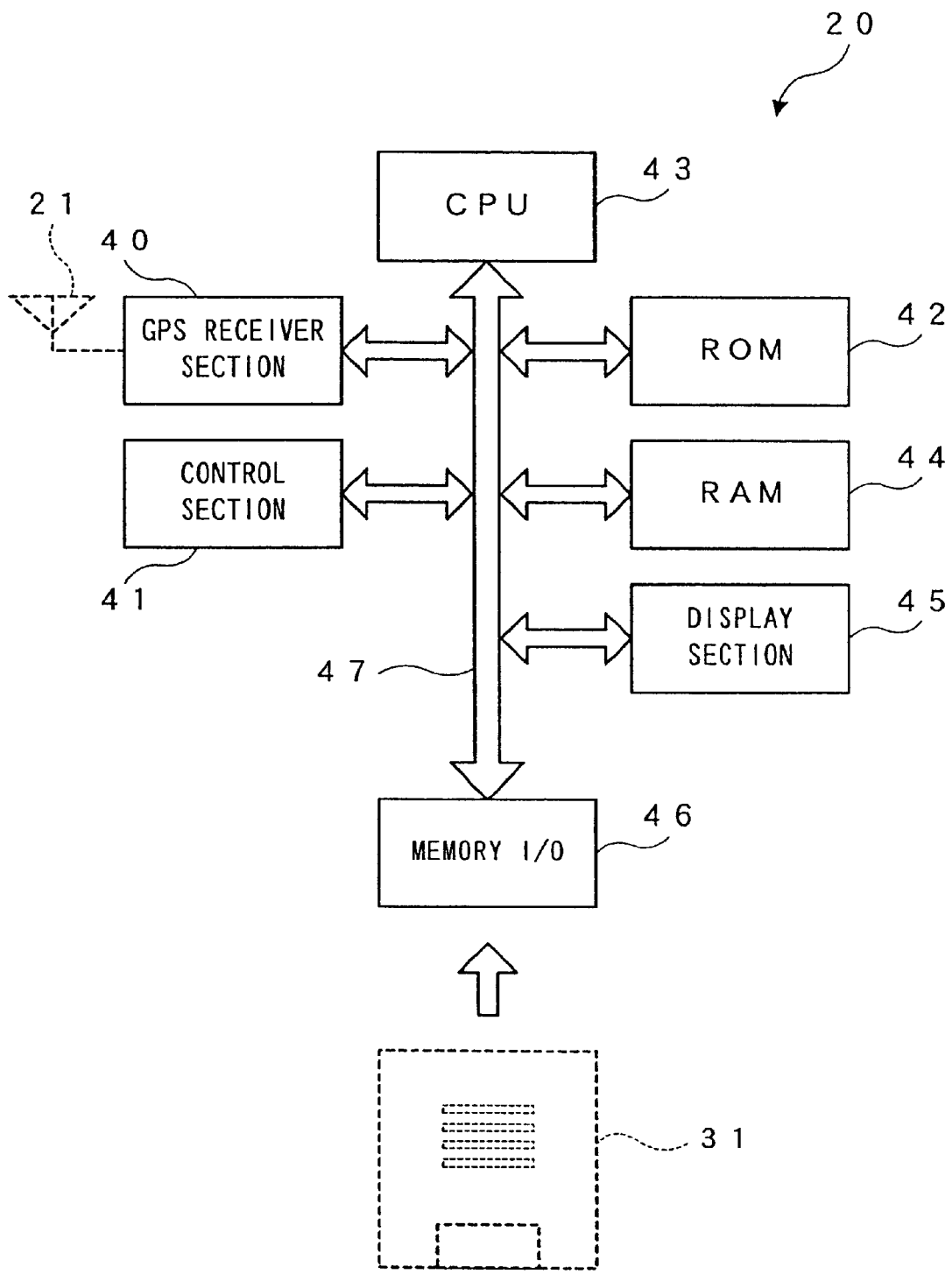
FIG. 2 is a block diagram showing the internal construction of the map display unit shown in FIG. 1.

FIG. 2 shows a block diagram of the map display unit 20. The map display unit 20 is constructed of a GPS receiver section (position detection means) 40 for modulating a signal received through the GPS antenna 21 to measure the present position of the unit 20, a control section 41 including the key switch group 23, a ROM 42 in which a program and data necessary for displaying a map are stored, a CPU (which constitutes extraction means, display control means, and set means) 43 for executing the program, a RAM 44 employed as a working area for the CPU 43, a display section (display means) 45 including the liquid crystal display 22, and a memory mapped I/O 46 for interfacing with the memory card 31. These sections are interconnected by a bus 47.

Figure 9:
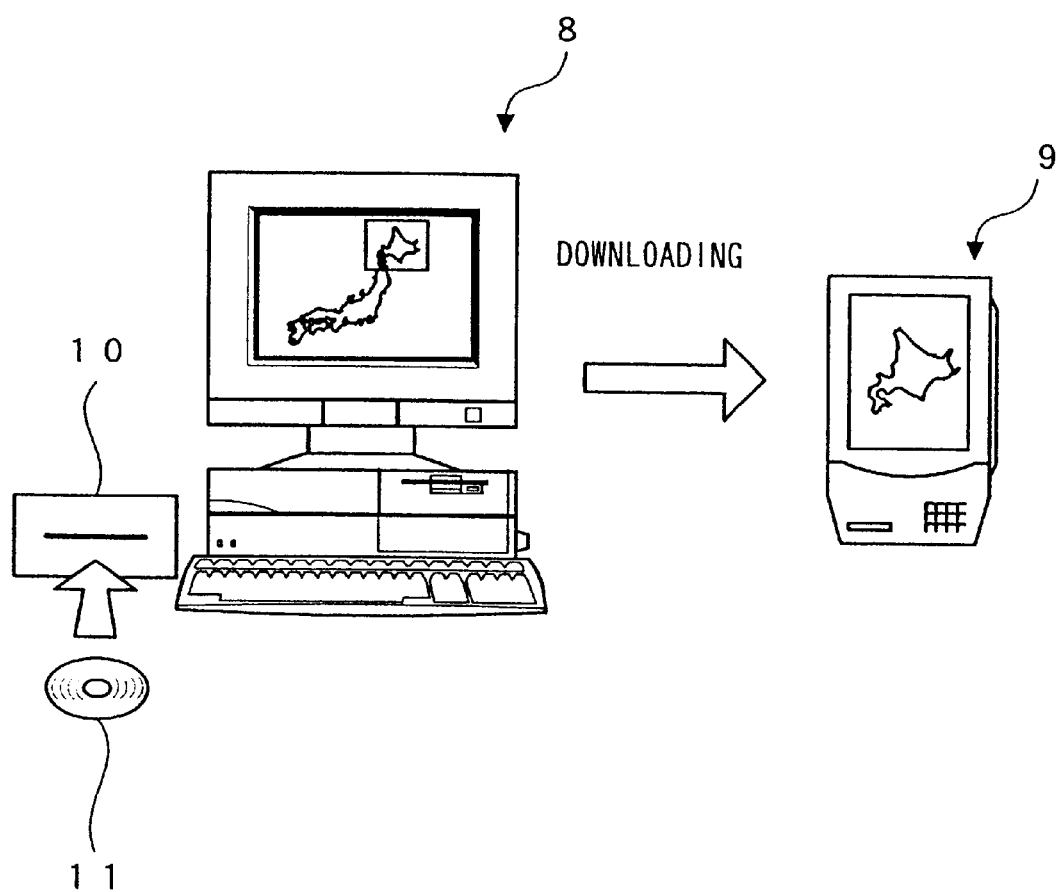
FIG. 9 is a diagram showing how map information is downloaded from a map server to a portable map display unit.

The memory card 31 (storage means) stores, for example, map information downloaded from the map server 8 shown in FIG. 9. The memory card 31 does not have so much storage capacity (540 MB) as the map disk, but has storage capacity enough to store only necessary map information.

Figure 3:
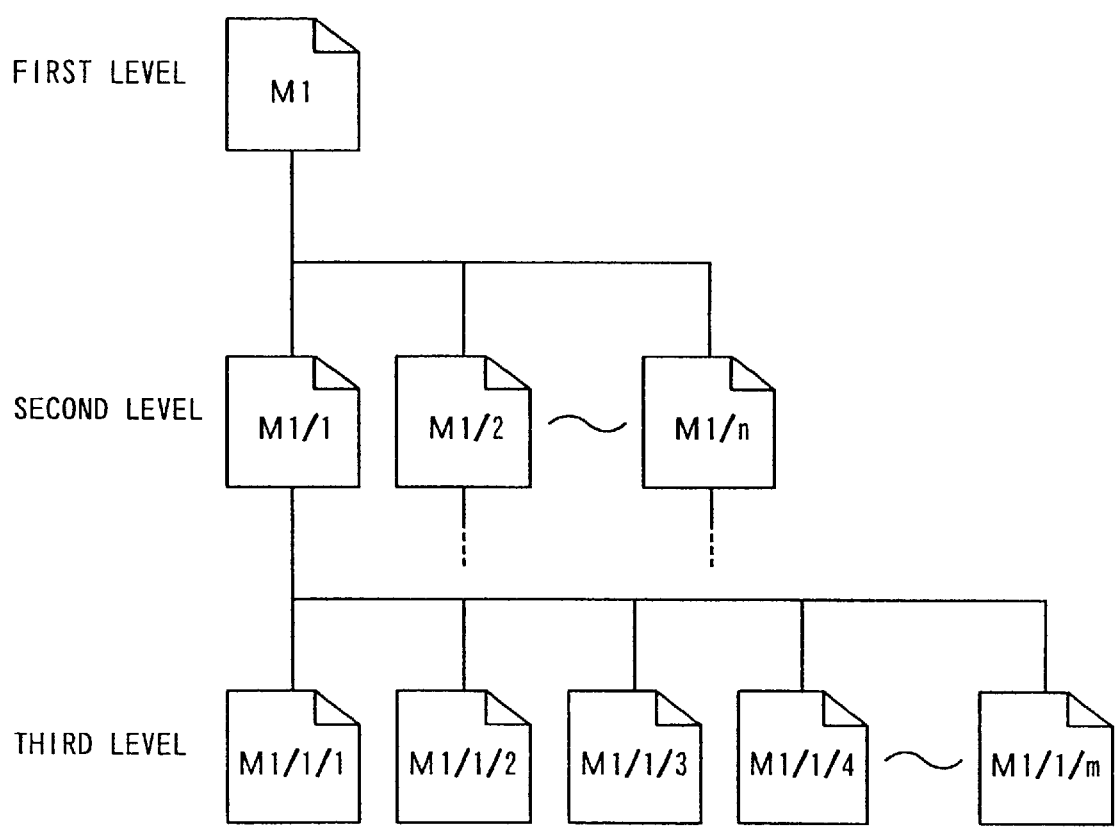
FIG. 3 is a diagram showing the three-level memory structure used in the memory card shown in FIG. 1.

FIG. 3 shows the map information stored in the memory card 31. The memory card 31 has a hierarchical memory structure, which consists of a first level(small-scale) where a wide area map of, for example, the "Hokkaido" district is located, a second level(medium-scale) where sectional maps are located, and a third level(large-scale) where detailed maps are located.

In FIG. 3, reference character M1 denotes a wide-area map, M1/1 denotes a first sectional map of M1, and M1/1/1 denotes a first detailed map of M1/1. According to this hierarchical structure, one wide-area map, n sectional maps, and m detailed maps are stored.

Note that the relation of reduced scales is "wide-area map"<"sectional map"<"detailed map." In the illustrated example, although three kinds of maps on a reduced scale are stored, these three kinds are shown merely for simplifying explanation. In practice, many kinds of maps on a reduced scale are stored, and accordingly, the memory card 31 has a hierarchical memory structure of three levels or more.

Now, assuming the present place is included somewhere in the first detailed map (M1/1/1), a map to be displayed may be the first detailed map (M1/1/1), the first sectional map (M1/1) in the higher level than that, or the wide-area map (M1) in the highest level. When a route is planned, it is desirable to display the wide-area map or first sectional map that can overlook a wide range. At a place near an intermediate place or destination, it is desirable to display the detailed map that can pinpoint fine circumstances.

On the other hand, if the detailed map (M1/1/1) in the third level were displayed at a place near an intermediate place, the present position will move out of that map sooner or later with the movement thereof. In that case, if there is no rule about the reduced scale of a map to be displayed next, the sectional map (M1/1) in the second level is displayed or the wide-area map (M1) in the first level is displayed, and consequently, a switch of maps is unnaturally performed and causes a sense of incongruity.

Hence, this embodiment decides the following rule.

FIG. 4 shows the "menu screen for specifying a selection mode for a displayed map" displayed on the liquid crystal display 22 just after the power switch 30 of the map display unit 20 has been turned on (or after a display of an arbitrary initial screen).

In addition to a message of "Specify a selection mode for a displayed map," three menu items, "largest-enlargement map mode," "same-scale map mode," and "manual selection mode" are displayed on the screen. These modes can be selected with the direction keys 24 and 27, and the selected mode can be decided with the OK key 28.

(1) Largest-enlargement Map Mode:

If this mode is decided, the largest-enlargement map (i.e., largest-scale map) in the maps stored in the memory card 31, including the present position, is displayed on the screen. That is, in the hierarchical structure of the map information of FIG. 3, the detailed map (M/1/i where i=1, 2, ..., and m) in the third level is displayed. This detailed map (M/1/i), as previously described, is a detailed map of a city, etc., and a map drawn in greater detail than that is not present.

Therefore, according to this "largest-enlargement map mode," a detailed map suitable in moving over complicated geographical features or a city can be displayed, whereby the accuracy of route guidance can be enhanced.

Note that, depending on the degree of a reduced scale (particularly, a reduced scale that can know the shape of a building), there are cases where the corresponding map is not prepared in the map disk 11 shoved in the CD-ROM drive unit 10 of the map server 8 of FIG. 9. For instance, the detailed maps equivalent to the aforementioned basic maps presently include only main cities. For this reason, if the largest-enlargement map is used as a map on a scale of 1/2,500 or 1/5000 equivalent to the aforementioned basic map, there will be no map to which the largest-enlargement map is switched, when the present position moves to suburbs.

In such a case, the two following cases are applied. The first rule is to select a "map including the present position and also having a reduced scale near to the largest scale" in the maps stored in the memory card 31. When this rule is applied, it is desirable to display a note that the reduced scale has been changed. The second rule is to continue to display only the present position without displaying a new map. The portion on the screen having no map has a monochromatic color (e.g., white).

Figure 5:
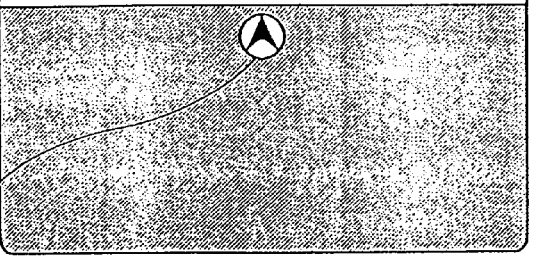
FIGS. 5A–5C are diagram showing the largest-enlargement map mode displayed on the liquid crystal display of FIG. 1.

FIG. 5 shows examples that the aforementioned two rules are applied to. FIG. 5A shows the case where, when the mark 22a representing the present position is approaching the edge of the map being displayed, the largest-scale map corresponding to the area into which the present position was moved cannot be found in the memory card 31. That is, a message, "There is no map on this scale. Do you want to change the reduced scale to display the corresponding map?", is displayed. If the OK button 28 is pressed, the aforementioned first rule is applied. On the other hand, if the cancel button 29 is pressed, the aforementioned second rule is applied. FIG. 5B shows the case where the first rule is applied, while FIG. 5C shows the case where the second rule is applied.

When the first rule is applied, two maps on different scales are displayed. For instance, a map on a scale of A (largest scale) and a map on a scale of B (scale near to the largest scale) are displayed. On the other hand, when the second rule is applied, only the map on a scale A is displayed and moving marks 22a' and 22a" alone are displayed in the white-colored area into which the present position was moved.

Figure 6:
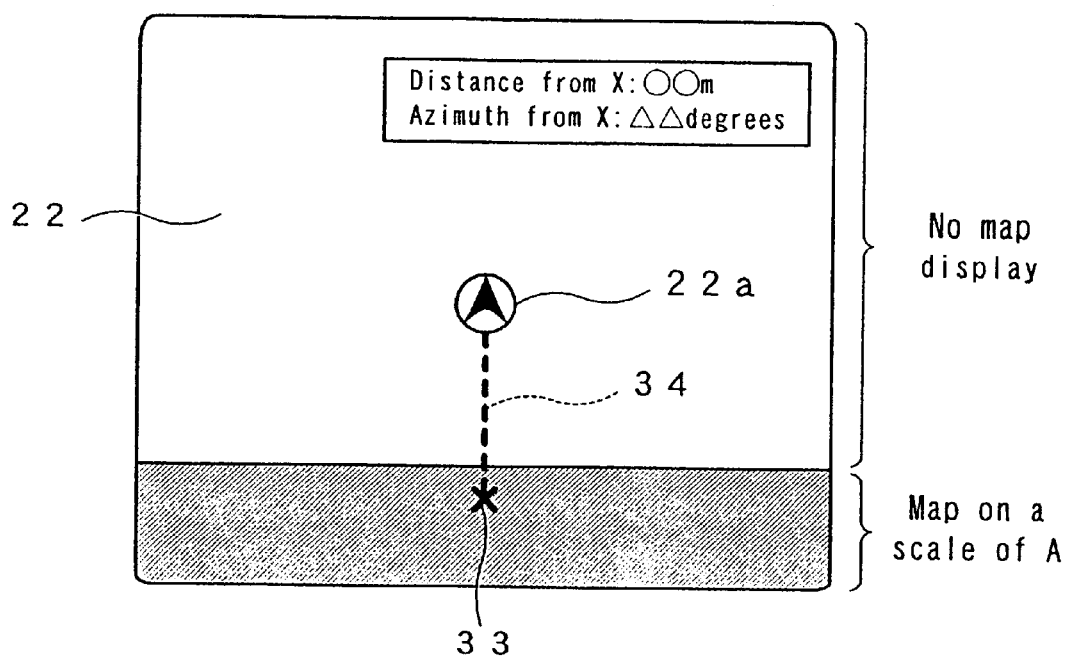
FIG. 6 is a diagram showing the case where the largest-scale map corresponding to the area into which the present position was moved cannot be found in the memory card.
Figure 8:
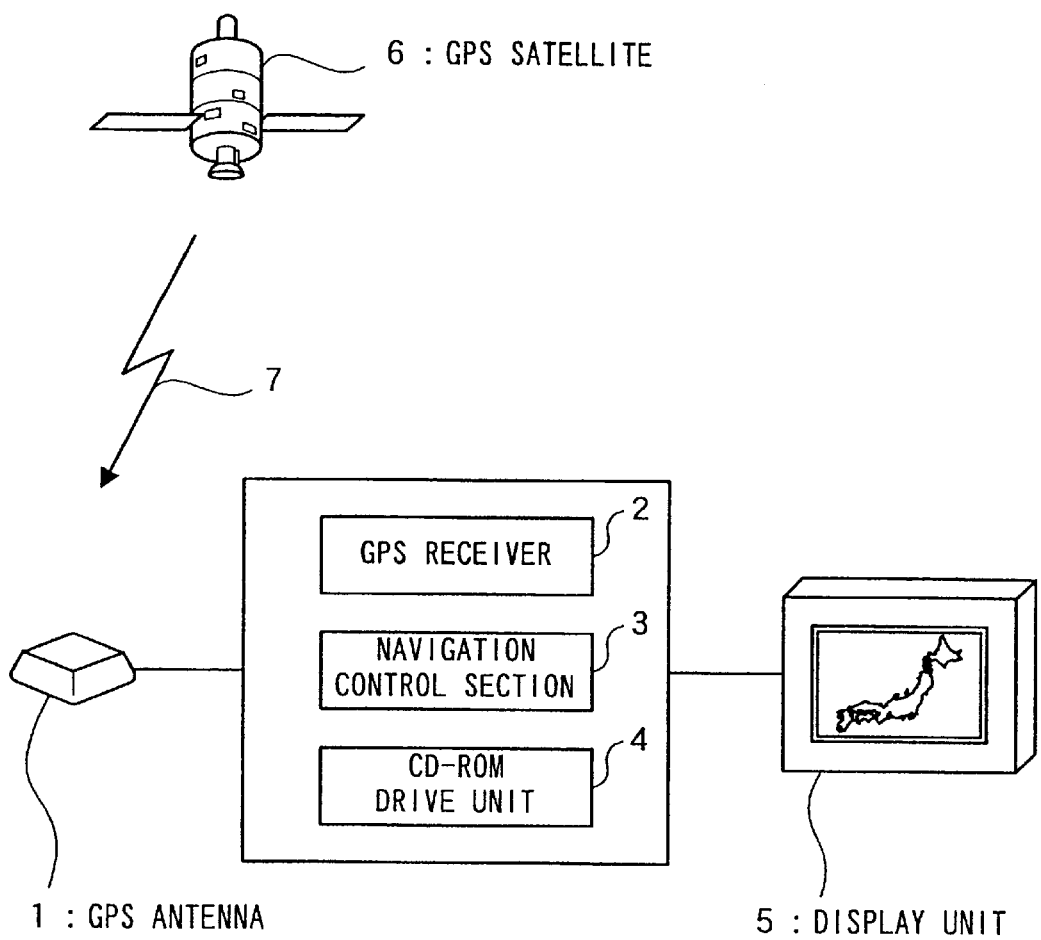
FIG. 8 is a schematic diagram showing a vehicle navigational system.

Also, when the second rule is applied, as shown in FIG. 6, the distance information and azimuth information from the last mark position 33 displayed on the map on a scale of A to the newest mark 22a are displayed. Also, it is desirable to draw a pairing line 34 or display a moving locus between the last mark position 33 and the newest mark 22a. This additional display may be made immediately after the present position has moved out of the map on a scale of A.

(2) Same-scale Map Mode:

In the aforementioned largest-enlargement map mode, the largest-enlargement map (i.e., the largest-scale map) is always selected. As previously described, a sufficient number of the largest-scale maps is not prepared except large cities, so the change of a reduced scale frequently occurs depending on districts and this frequent change is not nice to look at.

Hence, in such a district, the "same-scale map mode" is selected. In this mode, an arbitrary reduced scale can be specified. Thereafter, the map on the specified scale can be selected and displayed. For example, if the largest scale is specified, the mode is the same as the aforementioned "largest-enlargement map mode." However, if a reduced scale (i.e., the reduced scale of a sufficient number of maps prepared at each district) smaller than the largest-enlargement map mode is specified, the change of the reduced scale will not occur and this will be nice to look at.

(3) Manual Selection Mode:

In this mode, information about all maps including the present position, stored in the memory card 31, is displayed as a list along with the reduced scales and is manually selected. Time is required, but a map on an optimal scale can be displayed. Also, even in the case where the present position moves out of a map being displayed, information about all the corresponding maps is displayed as a list along with the reduced scales.

(4) Change of a Mode:

As previously described, the aforementioned three modes can be selected immediately after the power switch 30 has been turned on. Furthermore, if a change can be made from an arbitrary mode to another mode, it is desirable, because the operability is enhanced.

For instance, as shown in FIG. 7, icons 35~37 for all the modes may be displayed on the lower portion of the screen. In this case, the icon 35 for a mode being executed is reversely displayed, and if an icon other than that is selected with the right and left keys 25 and 26 and decided with the OK key 28, the mode being executed will be switched to the mode allocated to the decided icon.

(5) Countermeasure in each Mode when there is no Corresponding Map:

When maps are downloaded from the map server, maps in all ranges including a planed route should be specified, but there are cases where the range is erroneously specified or the plan is changed during movement.

In such a case, there is a situation that even in any of the aforementioned modes, a map to be displayed has not been stored in the memory card 31, so that only the present-position mark is displayed. In order to avoid such a situation, a map on a predetermined scale is downloaded in the memory card 31 regardless of user's specification, when maps are downloaded from the map server.

The predetermined-scale map here means one that must overcome a barrier when the present position moves out of the range of the map. For example, when going out from our territory, a predetermined procedure (procedure for departure from a country) must be performed at a predetermined place, so the wide-area map of our territory is suitable as the predetermined-scale map. The predetermined-scale map may be constituted by one wide-area map or a plurality of divided maps. Note that when the map display unit 20 according to this embodiment is utilized in a foreign country (A country), the aforementioned "our territory" is replaced with an "A country."

While the present invention has been described with reference to the measurement of a position utilizing the GPS technique, the invention is applicable to the measurement of a position utilizing a small-zone type mobile telephone technique (personal handy-phone system (PHS)), in which a service area is divided into small zones with a radius of a few hundred meters to a few kilometers and radio communications is performed between a base station provided in each zone and mobile stations within the zone. The reason is that, in the small-zone type mobile telephone technique, the home memory station always grasps the zone position of each mobile state and the PHS with a small zone radius is not as accurate as the GPS but has a measurement accuracy of a few hundred meters.

What is claimed is:

1. A map display unit comprising:

position detection means for detecting its present position;

storage means for storing map information on various scales including a predetermined map on a predetermined scale which must overcome a barrier in order to move out of said predetermined map;

extraction means for extracting map information including said present position detected by said position detection means from said storage means in accordance with a predetermined extracting rule;

display control means for synthesizing a mark representing said present position and the extracted map information and then displaying them on display means; and set means for setting said extracting rule;

wherein said set means sets a first rule for most preferentially extracting map information on the largest scale and a second rule for most preferentially extracting map information on a specified scale.

2. The map display unit as set forth in claim 1, wherein said set means further sets a third rule for having a user select displayed scales of corresponding maps and also extracting map information on the selected scale.

3. The map display unit as set forth in claim 1, wherein said set means sets a fourth rule for extracting a map on the second-largest scale in corresponding maps when a map on the largest scale is not present in the corresponding maps in setting said first rule, and also displays a message indicating that the scale of the map has been changed.

4. The map display unit as set forth in claim 1, wherein said set means sets a fifth rule for having a user select one of displayed scales of corresponding maps when a map on a specified scale is not present in the corresponding maps in setting said second or third rule and also for extracting a map on the selected scale, and said set means also sets a sixth rule for displaying only the present-position mark without extracting the corresponding maps when the scales of the corresponding maps are not selected.

5. The map display unit as set forth in claim 4, wherein said set means displays information indicating a relative relation between a mark position on a map being displayed just before and the newest mark position in setting said sixth rule.

6. A map display unit comprising:

position detection means for detecting its present position;

storage means for storing map information on various scales;

extraction means for extracting map information including said present position detected by said position detection means from said storage means in accordance with a predetermined extracting rule;

display control means for synthesizing a mark representing said present position and the extracted map information and then displaying them on display means; and set means for setting said extracting rule;

wherein said set means sets a first rule for most preferentially extracting map information on the largest scale and a second rule for most preferentially extracting map information on a specified scale.

7. The map display unit as set forth in claim 6, wherein said set means further sets a third rule for having a user select displayed scales of corresponding maps and also extracting map information on the selected scale.

8. The map display unit as set forth in claim 7, wherein said set means sets a fifth rule for having a user select one of displayed scales of corresponding maps when a map on a specified scale is not present in the corresponding maps in setting said second or third rule and also for extracting a map on the selected scale, and said set means also sets a sixth rule for displaying only the present-position mark without extracting the corresponding maps when the scales of the corresponding maps are not selected.

9. The map display unit as set forth in claim 6, wherein said set means sets a fourth rule for extracting a map on the second-largest scale in corresponding maps when a map on the largest scale is not present in the corresponding maps in setting said first rule, and also displays a message indicating that the scale of the map has been changed.

10. The map display unit as set forth in claim 6, wherein said set means sets a fifth rule for having a user select one of displayed scales of corresponding maps when a map on a specified scale is not present in the corresponding maps in setting said second or third rule and also for extracting a map on the selected scale, and said set means also sets a sixth rule for displaying only the present-position mark without extracting the corresponding maps when the scales of the corresponding maps are not selected.

11. The map display unit as set forth in claim 10, wherein said set means displays information indicating a relative relation between a mark position on a map being displayed just before and the newest mark position in setting said sixth rule.

\* \* \* \* \*